United States Patent
Bunsch et al.

(10) Patent No.: US 6,925,903 B2
(45) Date of Patent: Aug. 9, 2005

(54) SHIFT DEVICE

(75) Inventors: Rainer Bunsch, Hamburg (DE); Dieter Junge, Grünendeich (DE); Armin Segler, Grünendeich (DE)

(73) Assignee: DaimlerChrysler AG, Stuttgart (DE)

( * ) Notice: Subject to any disclaimer, the term of this patent is extended or adjusted under 35 U.S.C. 154(b) by 240 days.

(21) Appl. No.: 10/348,179

(22) Filed: Jan. 21, 2003

(65) Prior Publication Data

US 2003/0136213 A1 Jul. 24, 2003

(30) Foreign Application Priority Data

Jan. 24, 2002 (DE) .......................... 102 02 577

(51) Int. Cl.⁷ .............................. B60K 17/04
(52) U.S. Cl. .............................. 74/473.12; 74/473.21; 74/473.3
(58) Field of Search .................. 74/473.12, 473.21, 74/473.22, 473.3, 473.33, 473.36

(56) References Cited

U.S. PATENT DOCUMENTS

| | | | | |
|---|---|---|---|---|
| 5,540,180 A | * | 7/1996 | Kataumi et al. ........... 116/28.1 |
| 5,582,071 A | * | 12/1996 | Fujii ........................ 74/411.5 |
| 5,592,856 A | * | 1/1997 | Parsons .................... 74/473.3 |
| 5,809,839 A | * | 9/1998 | Tomida .................... 74/473.3 |
| 6,494,111 B1 | | 12/2002 | Lee | |

FOREIGN PATENT DOCUMENTS

| | | |
|---|---|---|
| DE | 3 906 965 | 9/1990 |
| DE | 199 26 602 | 8/2000 |
| EP | 0 620 385 | 10/1994 |

* cited by examiner

Primary Examiner—David M. Fenstermacher
(74) Attorney, Agent, or Firm—Klaus J. Bach

(57) ABSTRACT

In a shift device for an electronically controllable control unit of a motor vehicle having a shift selector lever (1) which can be pivoted on a transverse spindle (7), mounted on a selector-lever support structure (20), against the action of a spring (10), the selector-lever support structure (20) being arranged together with the selector lever (1) pivotally on support hosing (23), which includes an opening (27) holding the spring (10), the selector lever support structure (20) has a slotted-guide opening (8) receiving a guide pin (9), which is supported in a slot (22) in the support housing (23) and can be shifted against the force of the spring (10), for shifting the selector lever (1) into at least two locking positions.

6 Claims, 2 Drawing Sheets

SHIFT DEVICE

BACKGROUND OF THE INVENTION

The invention relates to a shift device for an electronically controllable control unit of a motor vehicle, having a shiftable selector lever which is pivotally supported on a transverse spindle, and which is disposed in a selector-lever housing. The lever can be moved counter to the action of a spring, the selector-lever housing being arranged together with the selector lever in a pivotable manner on a shift spindle.

A slot cover for a slotted housing of an outer shift mechanism for a motor-vehicle gearbox is already known from DE 199 26 602 A1. It includes a gear stick which is mounted in a manner such that it can pivot to a limited extent both, in a longitudinal direction and transversely, with respect to the longitudinal direction. The slot cover arrangement comprises a longitudinal slot cover and a transverse cover which is arranged in a manner such that it can rotate relative to the longitudinal slot cover about a pivot spindle and has a passage opening through which the shift stick passes. In order to reduce the required space of a slot cover for a slotted housing of an outer shift mechanism, the passage opening is arranged offset with respect to the pivot spindle of the transverse cover.

It is the object of the present invention to provide a shift device for an electronically controllable control unit in such a manner that it is easy to install and requires only a few components.

SUMMARY OF THE INVENTION

In a shift device for an electronically controllable control unit of a motor vehicle having a shift selector lever (1) which can be pivoted on a transverse spindle (7), mounted on a selector-lever support structure (20), against the action of a spring (10), the selector-lever support structure (20) being arranged together with the selector lever (1) pivotally on support hosing (23), which includes an opening (27) holding the spring (10), the selector lever support structure (20) has a slotted-guide opening (8) receiving a guide pin (9), which is supported in a slot (22) in the support housing (23) and can be shifted against the force of the spring (10), for shifting the selector lever (1) into at least two locking positions.

The selector lever or jogging lever can be installed and its operation can be improved in a simple, cost-effective manner, i.e. the selector lever can be shifted in a simple manner out of its latching position into a shift function from which the selector lever is automatically returned into the off position after the actuating force acting on the selector lever ceases. Furthermore, the selector lever can be shifted in a simple manner into a further latching position in order, for example, also to initiate a shift operation or in order to lock the selector lever in a second shift position.

Expediently, the selector lever can be locked in at least two positions by means of the guide pin held in the slotted-guide mechanism and, moreover, can be shifted into a third position.

According to a particular embodiment of the invention, the supporting part or the selector-lever housing is of fork-shaped or U-shaped design and fitted onto the housing part which is arranged fixedly together with the shift spindle, which intersects the transverse spindle at an angle, preferably at a right angle. The advantageous design and arrangement of the individual parts of the selector lever and of the shift housing or of the corresponding housing part installation of the entire device.

Furthermore, it is advantageous that the housing part consists of two side sections which extend parallel to each other and are connected to each other via a plate, which includes an upwardly extending slot-type opening for holding the guide pin which bears against the spring provided in the housing part. At both of its ends, the guide pin is held in the slotted-guide structure and can be shifted into different positions by means of the selector lever.

It is also advantageous for this purpose that the slotted-guide structure has two recesses which are arranged next to each other and are designed as latching points. The one recess is adjoined by an inclined sliding surface by which the guide pin can be engaged and along which it is guided when the selector lever has been moved out of one of its latching positions.

According to a preferred embodiment of the invention, provision is made for the guide pin to bear with one part against the slot-guide structure and with another part against the spring, which presses the guide pin against the sliding or bearing surface and/or into one of its latching positions.

It is of particular importance for the present invention that, after the selector lever and hence also the guide pin, has been shifted out of its one latching position, the said guide pin can be brought to bear against the sliding surface and the lever then returns again automatically via the spring into its one latching position if an actuating force no longer acts on the selector lever.

In conjunction with the design and arrangement according to the invention, it is advantageous that a respective slot-guide structure, in which the guide-pin is held in a shiftable manner, is provided in the same plane at both sides or both supporting parts of the selector-lever housing.

It is furthermore advantageous that the selector lever is arranged on a connecting part by which the two supporting parts extending parallel to each other are joined.

It is also advantageous that, for the purpose of holding the spring, the housing part and/or the associated plate has an inlet opening where also the slot-type opening is situated, so that the guide pin may extend through the inlet opening.

The invention will be described belwo in greater detail on the basis of the accompanying drawings.

DESCRIPTION OF A PREFERRED EMBODIMENT

Figure 1:
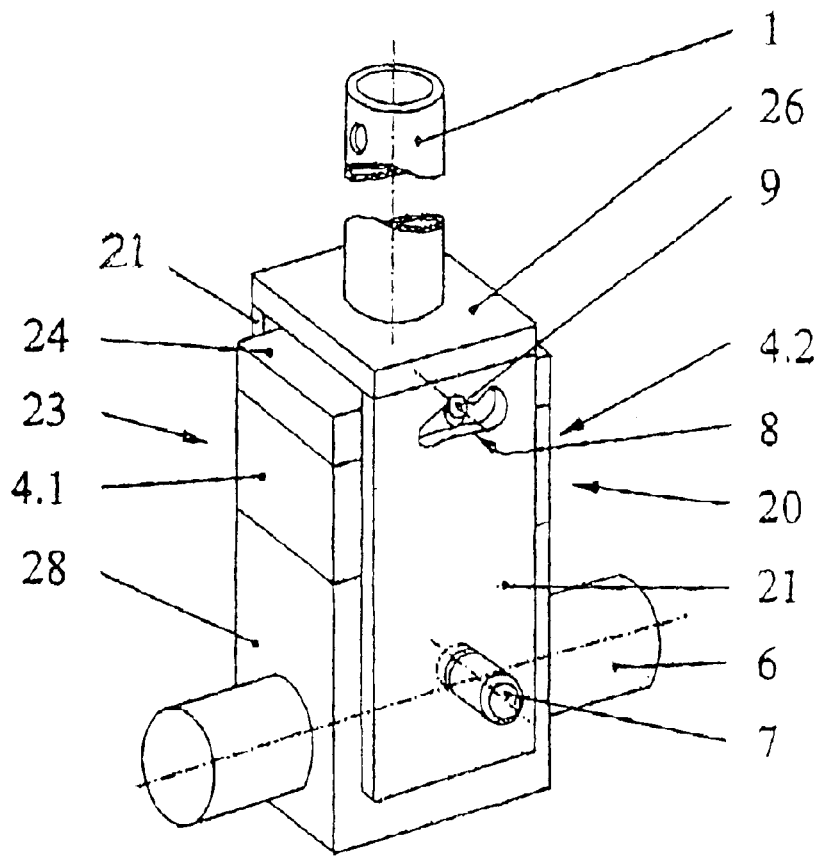
FIG. 1 is a perspective view of a selector lever, which is arranged on a pivot spindle, together with the associated housing part for holding an actuating spring.

FIG. 1 shows a selector lever 1, which is arranged fixedly on a cover or on a connecting part 26. The connecting part 26 interconnects two support parts 21 which are arranged at a distance from each other, extend parallel to each other, are of rectangular design and, in conjunction with the connecting part 26, form a fork-shaped support member 20. The support member 20 has, in the lower region, two transversely extending holes in which a transverse spindle 7 is supported.

Figure 2:
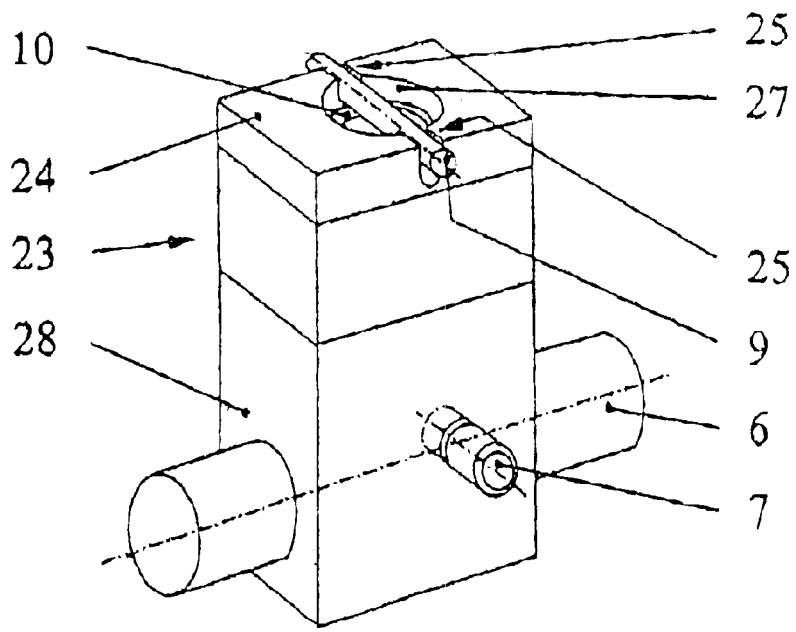
FIG. 2 is a perspective view of a housing part for holding the spring, together with the pivot spindle and a shift spindle, the housing part and including a slotted opening for receiving a guide pin.

The transverse spindle 7 is illustrated in FIG. 1 and also in FIG. 2. The transverse spindle 7 can also be connected fixedly to a housing part 23. The transverse spindle 7 is situated somewhat above a shift spindle 6 and intersects the latter at a right angle. The shift spindle 6 is, like the transverse spindle 7, held in the housing part 23 and makes it possible for the housing part 23 to be pivoted together with the support part 21 about this spindle 6 when a force is exerted for this purpose on the shift selector lever 1, in order, for example, to trigger a shift operation in the associated gearbox of the motor vehicle.

The housing part 23 is part of a selector-lever housing 20 which, according to FIG. 2, is of rectangular design and comprises four side parts 4.1, 4.2 with a central opening 27, in which a spring 10 is accommodated. The selector-lever housing 20 or the housing part 23 has, at its upper end, a plate 24 with the inlet opening 27 through which, according to FIGS. 2/3, the spring 10 can be inserted. The spring 10 is a coil spring and ends with its uppermost turn somewhat below the upper inlet opening 27.

A slot-type opening 25 is likewise provided in the plate or connecting part 24, in which the inlet opening 27 is situated, the said slot-type opening being open upwards, with respect to the drawing according to FIG. 2, and holding a guide pin 9. According to FIG. 2, the guide pin 9 rests with both of its ends in the two opposite slot-type openings 25. In this slot-type opening 25, the guide pin 9 can be shifted vertically between an upper position as shown in FIG. 1 and a lower position, which is not illustrated in the drawing. In the lower position, the guide pin 9 comes to bear against the lower boundary 17 of the slot-type opening 29.

Figure 3:
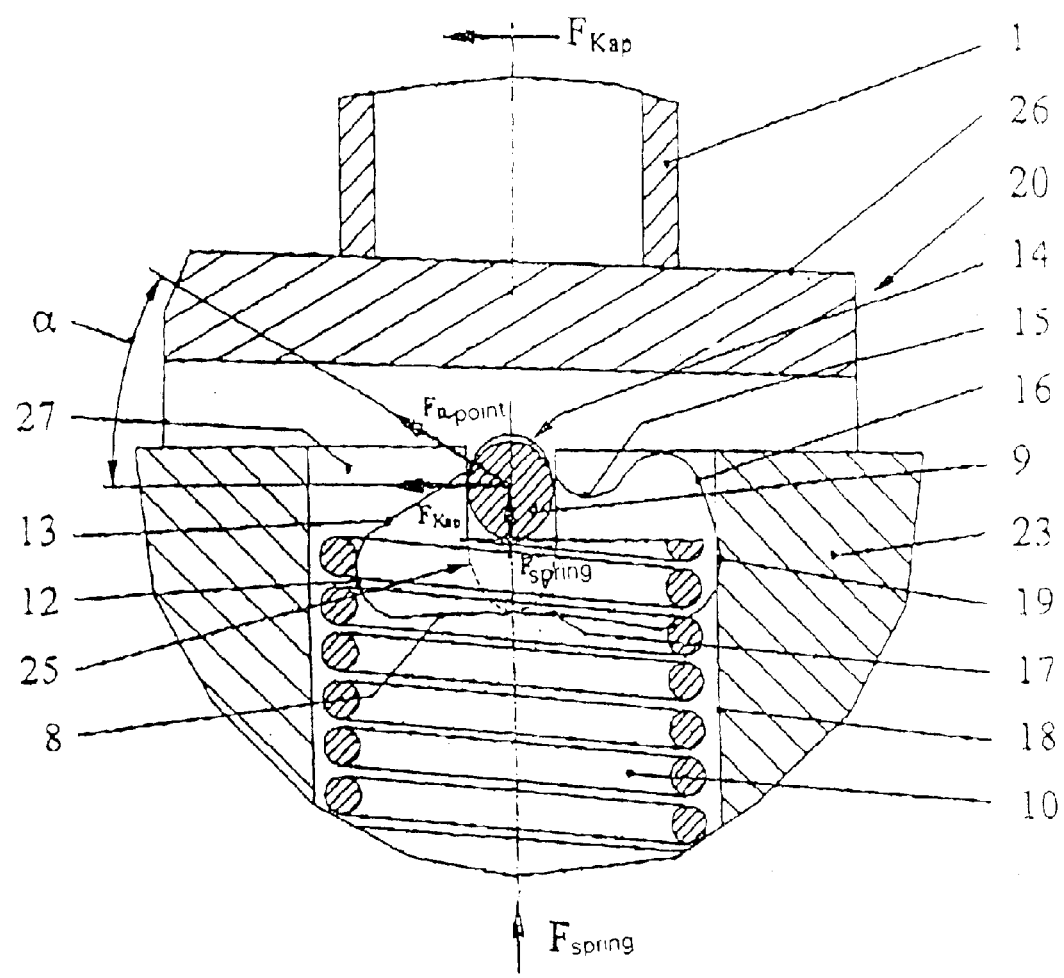
FIG. 3 is a sectional view of part of the housing for holding the spring together with the associated slot-guide structure for guiding the guide pin, and supporting the selector lever.

In FIGS. 1 and 3, the selector lever 1 is in its neutral position or off position in which no shift operation is initiated at the gearbox. As is shown in FIG. 3, the guide pin 9 extends into two opposite slotted-guide structures 8 which have a length corresponding about to the diameter of the inlet opening 27 and a hole 18 for holding the spring 10. The slotted-guide structure 8 comprises an approximately horizontal guide part 17, which is adjoined by a rounded area 12, and an oblique guide part or a sliding surface 13, which is adjoined, in turn, by an upwardly pointing, first indentation 14 and a downwardly directed or convex indentation 15 and a further latching area or indentation 16. Furthermore, the indentation 16 is adjoined by a curved sliding boundary surface 19 which is adjoined by a curved horizontally extending guide surface 17.

The selector lever 1 can be shifted by the action of an actuating force $F_{KAP}$, which is initiated by an operator, from its off position, which is illustrated in FIGS. 1 and 3, to the right into the first latching position, which is represented by the indentation 16. For this purpose, if the selector lever 1 is being pivoted about the pivot spindle 7 in the clockwise direction according to FIG. 1, the guide pin is guided along the convex curved path or sliding surface 15 and, in the process, is pressed downwardly against the foece of the spring 10, so that it then moves into the indentation 16 and therefore into its second latching position. In this position, a shift operation at the gearbox can also be initiated. The selector lever 1 can be moved in this position into a second shift gate which is represented by this latching position.

Furthermore, the selector lever 1 can be pivoted out of its position according to FIG. 3 to the left about the pivot spindle 7 and in the process the pin 9 moves along the sliding surface 13. In this case, owing to the inclined sliding surface 13 as shown in FIG. 3, the guide pin 9 is likewise moved downwards and into the slot-type opening 25 where the lower boundary of the slot-type opening limits the downward movement of the guide pin 9. If, owing to an actuating force $F_{KAP}$ acting on the selector lever 1, the selector lever 1 has taken up a left end shift position and bears against the sliding surface 13, then, after the actuating force ceases, the spring 10 displaces the guide pin 9 upwardly and to the right and moves it into the indentation 14, where the guide pin 9 reaches its off position again.

The installation of the shift device is very simple, as can be seen from FIGS. 1 to 3, since for the assembly first the spring 10 is inserted into the opening or hole 27, then the selector-lever housing 20 is placed together with the guide pin 9 onto the housing part 23, in which case care has to be taken to ensure that the guide pin 9 passes into the slot opening 25. The pivot spindle 7 can then be inserted and the selector-lever housing 20 connected to the housing part 23.

For producing pivot and shifting forces, the guide pin 9 is guided in the groove or in the slot-type opening 25, so that it can only execute a vertical movement. In this case, the compression spring 10 presses the guide pin with the force $F_{spring}$ against the guide surfaces which are situated in the selector-lever device. When the selector lever 1 is actuated in the transverse direction according to FIG. 3, a force $F_{KAP}$ has to be applied to the selector lever in order to move the guide pin 9 downwards along the guide contour against the force of the spring $F_{spring}$. $F_{KAP}$ is calculated as follows ignoring the frictional force between the guide pin 9 and spring holder:

$$F_{KAP} = a/b \times F_{spring}/\tan \alpha$$

If the angle $\alpha$ depends on the angle of deflection $\beta$ of the selector lever, then $$F_{KAP} = f(\beta)$$

It follows herefrom that virtually any desired force-path profile can be obtained. With this arrangement, a transmission of relatively high actuating forces is possible, and the wear of the parts to be shifted can be reduced to a minimum.

What is claimed is:

1. A shift device for an electronically controllable control unit of a motor vehicle comprising: a selector lever support housing (23) supported by a shift spindle (6) having a pivot axis so as to be pivotable in a shift plane, a selector-lever support structure (20) including a selector lever (1) pivotally supported with said support structure (20) on said support housing (23) by a transverse spindle (7) so as to be pivotable in a control plane normal to said shift plane, said selector lever support housing (23) including an opening (27) receiving a spring (10), and said support housing (23) including a guide slot (25) and a guide pin (9) supported in said guide slot (25) and being engaged by said spring (10) and guide openings (8) with guide surface areas (13, 14, 15, 16) formed in said selector lever support structure (20), said spring (10) biasing said guide pin (9) into engagement with said guide surface areas (13, 14, 15, 16) during sideward movement of the selector lever in the control plane normal to the shift plane, said guide surface areas of each guide opening (8) having a first indentation (14) for engagement of said pin (9) in a center position of said lever, a second indentation (16) arranged next to the first indentation at one side of the first indentation (14) and, at the side opposite the second indentation (16), an inclined sliding surface (13)

against which the guide pin (9) is biased when the selector lever (1) is shifted out of its center position away from the second indentation (16) so as to generate a force biasing the lever back toward its center position depending on the inclination of the inclined sliding surface (13).

2. A shift device according to claim 1, wherein said selector lever (1) is lockable in said at least two positions by means of the guide pin (9) being held in the slotted-guide structure (8) and, moreover, is shiftable into a third position.

3. A shift device according to claim 1, wherein the selector-lever support structure (20) is fork-shaped and is fitted onto the support housing (23) which is arranged fixedly on the shift spindle (6), that intersects the transverse spindle (7) essentially at an at a right angle.

4. A shift device according to claim 1, wherein the support structure (20) consists of at least two side parts (21) which extend parallel to each other and are connected to each other via a connector plate (26) on which said shift lever (1) is mounted.

5. A shift device according to claim 1, wherein the selector lever support structure (20) is U-shaped having spaced parallel legs (21) at opposite sides of the selector lever support housing (23) and the selector lever (1) is arranged on a connecting part (26) which interconnects the two spaced parallel legs (21).

6. A shift device according to claim 1, wherein said guide pin (9) extends through the opening (27) in the selector lever support housing (23).

* * * * *